(12) United States Patent
Masaki et al.

(10) Patent No.: US 7,692,344 B2
(45) Date of Patent: Apr. 6, 2010

(54) POLYPHASE CLAW POLE TYPE MOTOR

(75) Inventors: Ryoso Masaki, Hitachi (JP); Kazuhide Ebine, Narashino (JP); Yuji Enomoto, Hitachi (JP); Motoya Ito, Hitachinaka (JP)

(73) Assignee: Hitachi Industrial Equipment Systems Co., Ltd. (JP)

( * ) Notice: Subject to any disclaimer, the term of this patent is extended or adjusted under 35 U.S.C. 154(b) by 487 days.

(21) Appl. No.: 11/634,165

(22) Filed: Dec. 6, 2006

(65) Prior Publication Data
US 2007/0278894 A1 Dec. 6, 2007

(51) Int. Cl.
*H02K 11/00* (2006.01)
(52) U.S. Cl. .......................... 310/71; 310/257
(58) Field of Classification Search ................. 310/257, 310/71, 49 R
See application file for complete search history.

(56) References Cited

U.S. PATENT DOCUMENTS

| 4,054,809 A | * | 10/1977 | Jefferies | ................. | 310/256 |
| 5,691,583 A | * | 11/1997 | Suzuki et al. | ............. | 310/49 R |
| 2007/0035197 A1 | * | 2/2007 | Usui | ........................ | 310/257 |

FOREIGN PATENT DOCUMENTS

JP 2001-161054 6/2001

* cited by examiner

*Primary Examiner*—Nguyen N Hanh
(74) *Attorney, Agent, or Firm*—Antonelli, Terry, Stout & Kraus, LLP.

(57) ABSTRACT

In a motor having a pawl-shaped magnetic pole, if a coil is wound like a ring shape so as to be formed, one leader line can be generally drawn out to an external portion from a position close to an outer periphery of a stator, however, the other leader line is drawn out to the external portion from an inner periphery of the stator. Accordingly, the leader line occupies a part of the inner space formed by the stator core, so that there is generated a problem that a space factor of the coil is reduced. Accordingly, an object of the present invention is to improve the space factor of the coil. In order to achieve the object mentioned above, a space passing wirings of a plurality of coils therethrough is provided in a part of the pawl-shaped magnetic pole of the stator core of the stator having the pawl-shaped magnetic pole. Accordingly, one of leader lines of the coil is drawn out from an outer peripheral portion (or an opposite side to a side facing to the rotor) of the stator, and the other is drawn out in an axial direction from the space of the claw-shaped magnetic pole of the stator. Therefore, it is possible to do away with an influence by the leader line, it is possible to increase a winding number of the coil even in the same space, and it is possible to improve a downsizing of the motor.

15 Claims, 10 Drawing Sheets

POLYPHASE CLAW POLE TYPE MOTOR

INCORPORATION BY REFERENCE

The present application claims priority from Japanese application JP2006-150871 filed on May 31, 2006, the content of which is hereby incorporated by reference into this application.

BACKGROUND OF THE INVENTION

The present invention relates to a technique providing a polyphase claw pole type motor.

A motor is widely used in various fields. As one of aspects of the motor, there is a claw pole type motor having a claw-shaped magnetic pole. For example, as shown in JP-A-2001-161054 (patent document 1) (particularly, refer to FIGS. 1 and 4 to 5), a stator of one phase of the claw pole type motor is constituted by an annular coil circulating an electric current and having a circular shape, a pair of claw-shaped magnetic poles, and a magnetic body surrounding a periphery of the annular coil so as to form a magnetic path together with the pawl-shaped magnetic path.

SUMMARY OF THE INVENTION

In the case of a three-phase claw pole type motor, a stator can be formed by using three sets of the stator mentioned above having the claw-shaped magnetic poles. If a three-phase voltage is applied to these three sets of stators, a rotation torque is generated in a rotor to which a permanent magnet is fixed, and the rotor can be rotated. The claw pole type motor has no coil end and has a feature that it is possible to downsize the motor, in comparison with the conventional motor.

In an example shown in FIG. 10, a magnetic path of a stator for one phase is formed by combining stator cores 21 and 22 each having a pawl-shaped magnetic pole 24 in a facing manner. The structure is made such that an annular coil 23 is inserted to an internal space formed by combining the stator cores 21 and 22, and leader lines 23a and 23b are drawn out from an outer peripheral portion of the stator cores to an external portion. Accordingly, the stator 20 for one phase is structured. The three-phase stator is obtained by overlapping three sets of the stators 20, and a rotor 16 is combined therewith, whereby a three-phase claw pole type motor as shown in FIG. 10 can be structured. A method of integrally molding the stator core having the pawl-shaped magnetic poles by a magnetic powder by means of a pressing machine has a feature that a three-dimensional shape can be easily formed.

The motor having the pawl-shaped magnetic poles has the following problem. As shown in FIG. 10, if the annular coil 23 is wound like a ring shape so as to be formed, one leader line 23a can be generally drawn out to the external portion from a position close to an outer periphery of the stator, however, the other leader line 23b is drawn out to the external portion from an inner periphery of the stator, that is, a position close to the rotor. Showing this matter by a cross sectional view of the annular coil 23, FIG. 11 is obtained. Accordingly, the leader line 23b occupies a part of the space formed by the stator cores 21 and 22, so that a winding number of the coil is reduced. Therefore, a torque generated by the motor is limited.

Accordingly, an object of the present invention is to improve a space factor of a coil without being affected by a leader line of the coil, in a claw pole type motor having a claw-shaped magnetic pole.

In order to achieve the object mentioned above, the following countermeasure is employed.

In a polyphase claw pole type motor in which a pair of annular stator cores provided with claw-shaped magnetic poles are mated with each other, a plurality of one-phase stator each constituted by an annular coil generating a magnetic flux in the claw-shaped magnetic pole are provided so as to be positioned between a pair of stator cores, and a rotor generating a torque is provided in a rotating shaft, a part of the pawl-shaped magnetic pole of the stator core is provided with a space passing a wiring of a plurality of annular coils therethrough. Accordingly, one of leader lines of the coil is drawn out from an outer peripheral portion (or an opposite side to a side facing to the rotor) of the stator, and the other is drawn out in an axial direction from a space of the claw-shaped magnetic pole. Therefore, it is possible to do away with an influence by the leader line, and it is possible to increase the winding number of the coil even in the same space.

In this case, describing the structure of the stator in detail, the stator core is formed by N number of pawl-shaped magnetic poles having a magnetic pole surface extending in a direction of the rotating shaft so as to face to the rotor rotating around the rotating shaft with a gap, an annular diametrical yoke portion extending in a direction of an outer diameter from the claw-shaped magnetic pole, and an outer peripheral side yoke extending in a direction of the rotating shaft of the rotor from the diametrical yoke portion.

Further, the stator is formed by mating a pair of the stator cores with each other, and alternately positioning the pawl-shaped magnetic poles in an inner peripheral direction so as to face a leading end of the pawl-shaped magnetic pole to the diametrical yoke portion of the adjacent pawl-shaped magnetic pole.

Further, the stator is structured such that two stator cores hold the annular coil generating the magnetic flux therebetween.

In general, since the pawl-shaped magnetic pole of the stator core does not have a space capable of passing a plurality of wirings therethrough, at least one pawl-shaped magnetic pole is formed in a different shape from that of the other pawl-shaped magnetic poles, for forming one or more space passing the wirings of a plurality of annular coils therethrough. Accordingly, since it is possible to draw out the leader line in the axial direction, it is possible to improve a space factor of the coil.

The pawl-shaped magnetic pole having the different shape is obtained by differentiating the pawl-shaped magnetic pole at the Nth from an optional position, in the stator core. Since the shape is changed, it is possible to enlarge a gap width between the Nth pawl-shaped magnetic pole and the adjacent pawl-shaped magnetic pole, and it is possible to form a space passing the leader line of the annular coil therethrough.

The structure may be made such that an angle of the gap between the adjacent pawl-shaped magnetic poles is changed by changing the shape of the Nth pawl-shaped magnetic pale mentioned above. Alternatively, the structure may be made such that the Nth pawl-shaped magnetic pawl itself is deleted or is not provided.

In accordance with the present invention, it is possible to provide a motor having a more compact structure and a higher output, in comparison with the conventional type.

Other objects, features and advantages of the invention will become apparent from the following description of the embodiments of the invention taken in conjunction with the accompanying drawings.

Figure 1:
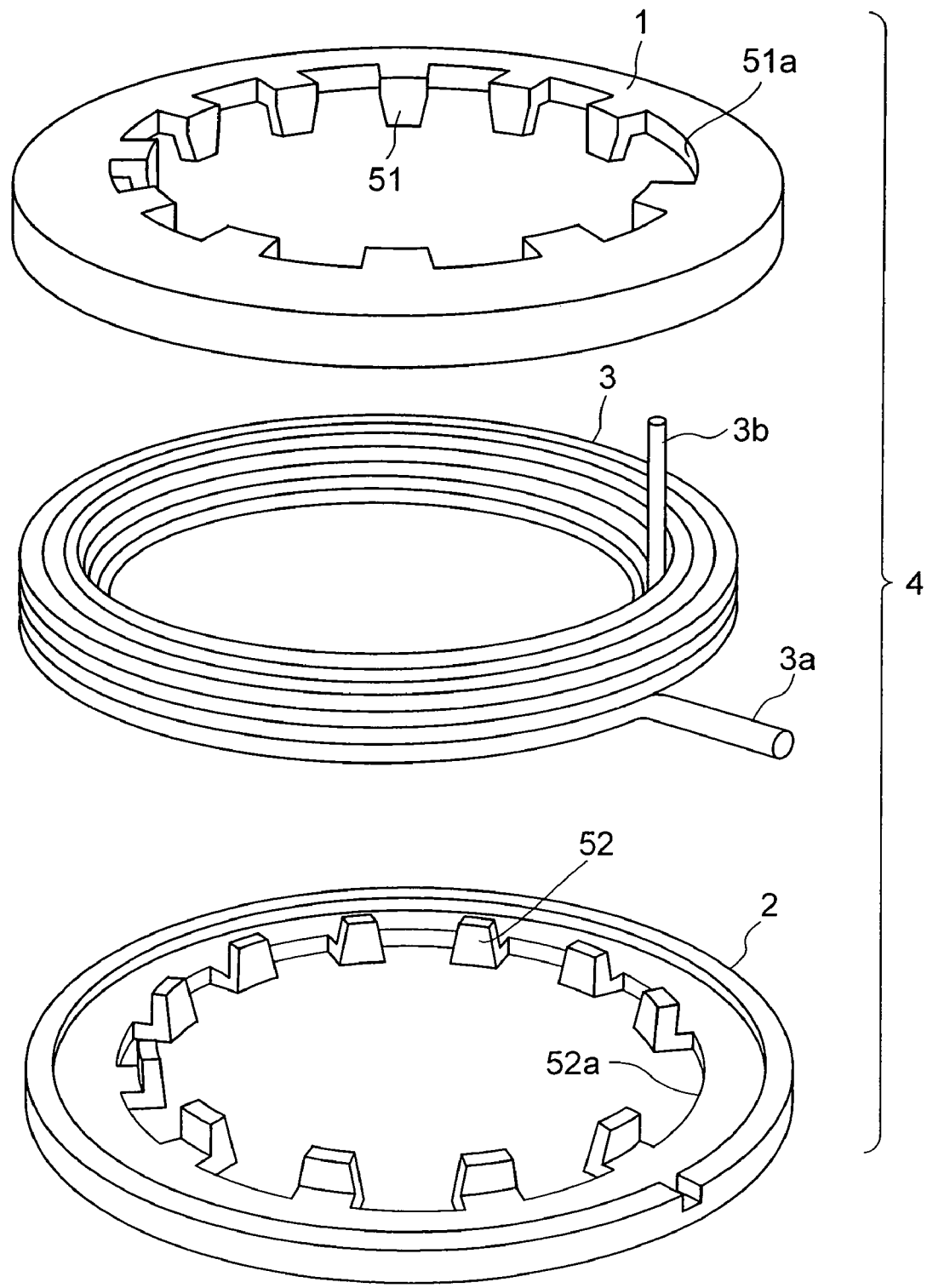
FIG. 1 is an exploded view of a stator for one phase of a three-phase motor which is characteristic for an embodiment in accordance with the present invention.

DESCRIPTION OF REFERENCE NUMERALS 1, 2, 5, 6, 9, 10: stator core
3, 7, 11, 23: coil
4, 8, 12, 20, 30, 40: stator for one phase
13, 14: magnetic field shielding material
15: wire connection portion
16: stator
21, 22: conventional stator core
20, 30, 40: conventional stator for one phase
51, 52, 24: pawl-shaped magnetic pole

DESCRIPTION OF THE EMBODIMENTS

A description will be given below of an embodiment in accordance with the present invention with reference to the accompanying drawings.

FIG. 1 is an exploded view of a stator 4 for one phase constituting a three-phase claw pole type motor which is characteristic for the present invention. In this case, a description will be given by setting the stator 4 to a U-phase stator. The U-phase stator 4 is constituted by stator cores 1 and 2 having pawl-shaped magnetic poles 51 and 52, and a U-phase coil 3. The stator cores 1 and 2 have the same shape. As shown in FIG. 1, the stator cores 1 and 2 are combined in a facing manner in such a manner as to hold the U-phase coil 3 therebetween. This is the U-phase stator 4. As a method of forming shapes of the stator cores 1 and 2, a method of compressing a magnetic powder coated by an insulating film by a pressing machine so as to integrally mold is suitable. It has a feature that a dimensional accuracy of parts can be secured without any after processing.

Figure 9:
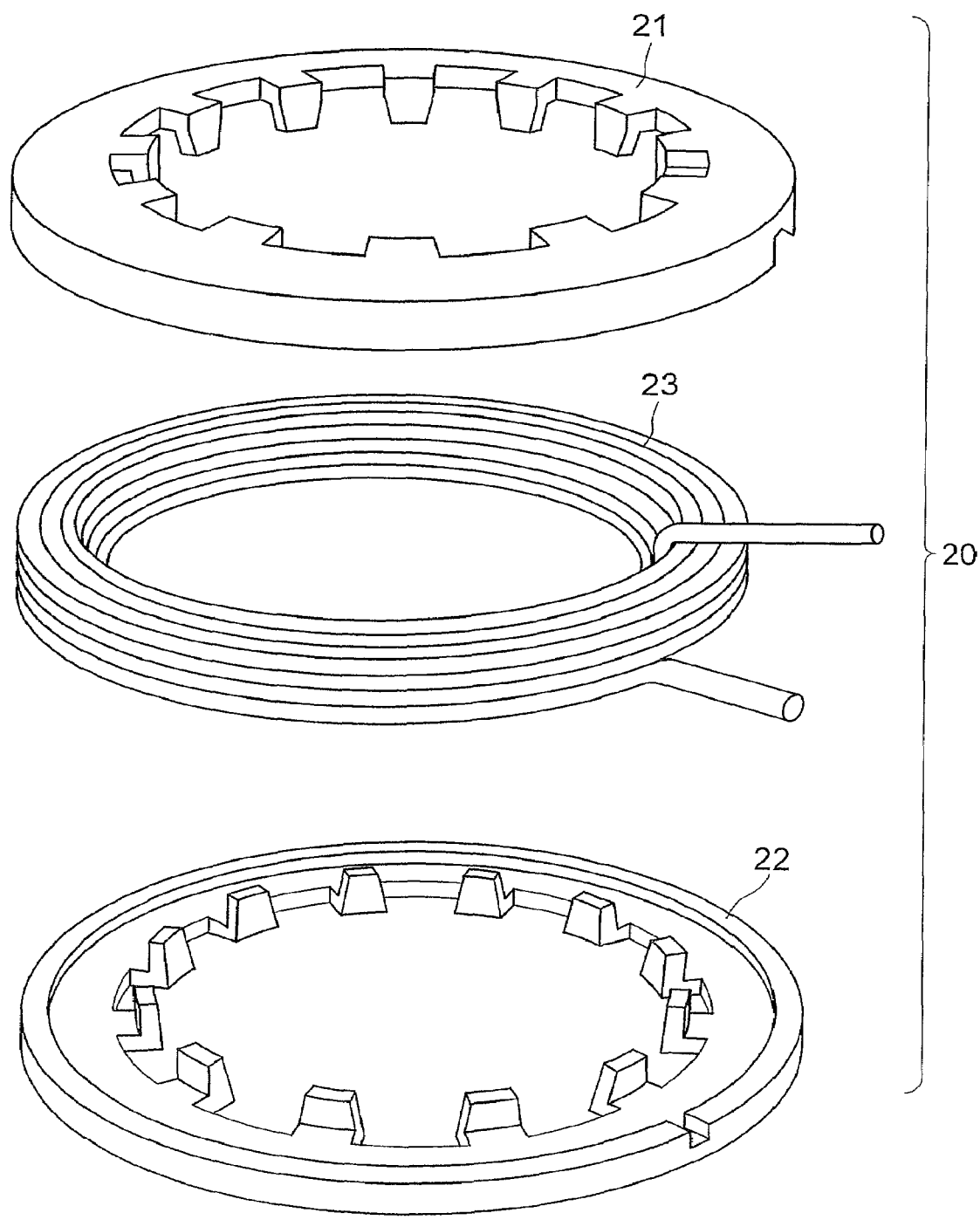
FIG. 9 is an exploded view of a stator for one phase of a three-phase motor having a conventional pawl-shaped magnetic pole.
Figure 10:
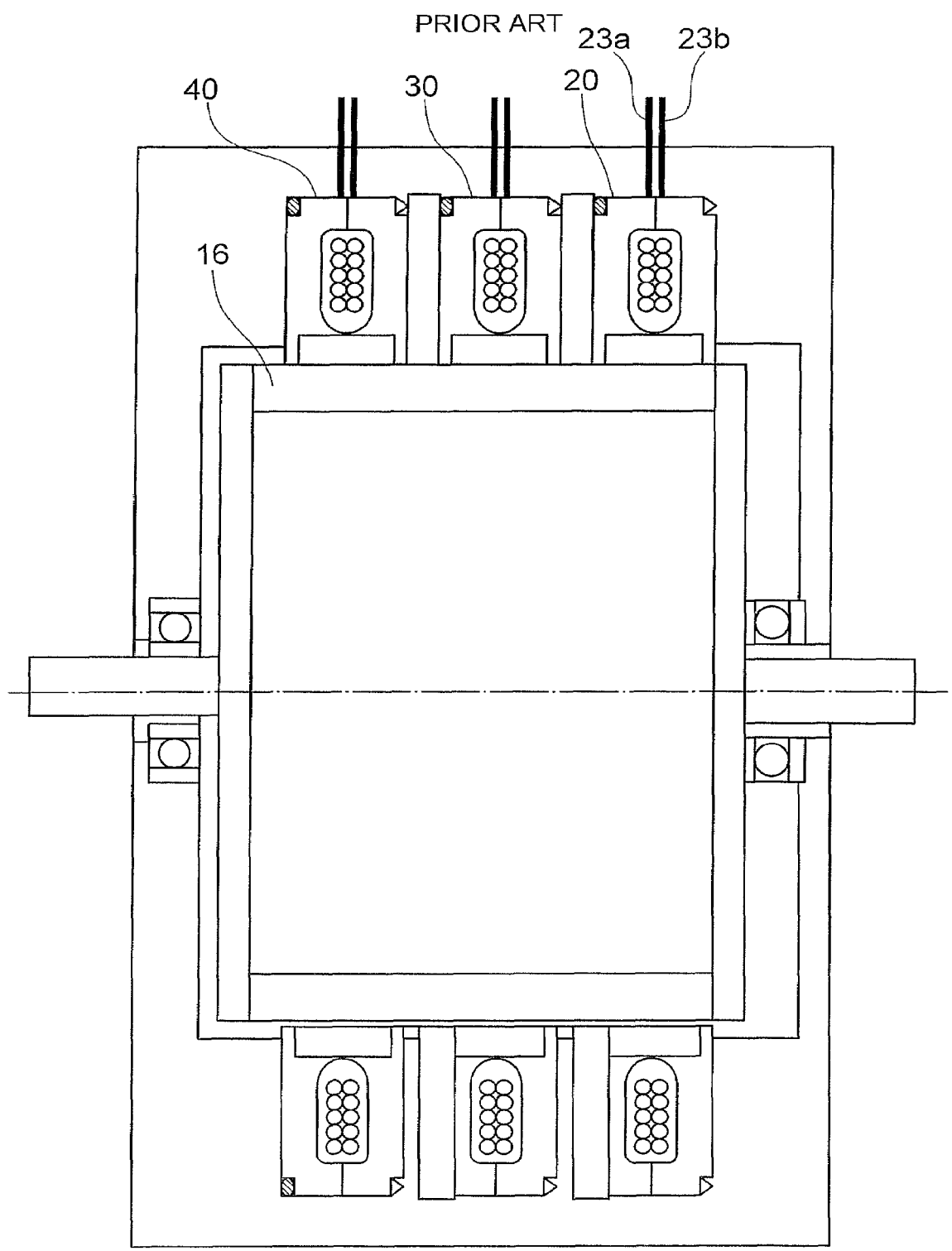
FIG. 10 is a cross sectional view of the three-phase motor having the conventional pawl-shaped magnetic pole.

In comparison with FIG. 9 corresponding to the conventional example, FIG. 1 is different in the following two points. The first point exists in a matter that the pawl-shaped magnetic pole is not provided at a position 51a in a plurality of pawl-shaped magnetic poles 51 in the stator core 1. In the same manner, the pawl-shaped magnetic pawl is not provided at a position 52a in the stator core 2. The second different point exists in a shape of a leader line 3b of the U-phase coil 3.

Figure 2:
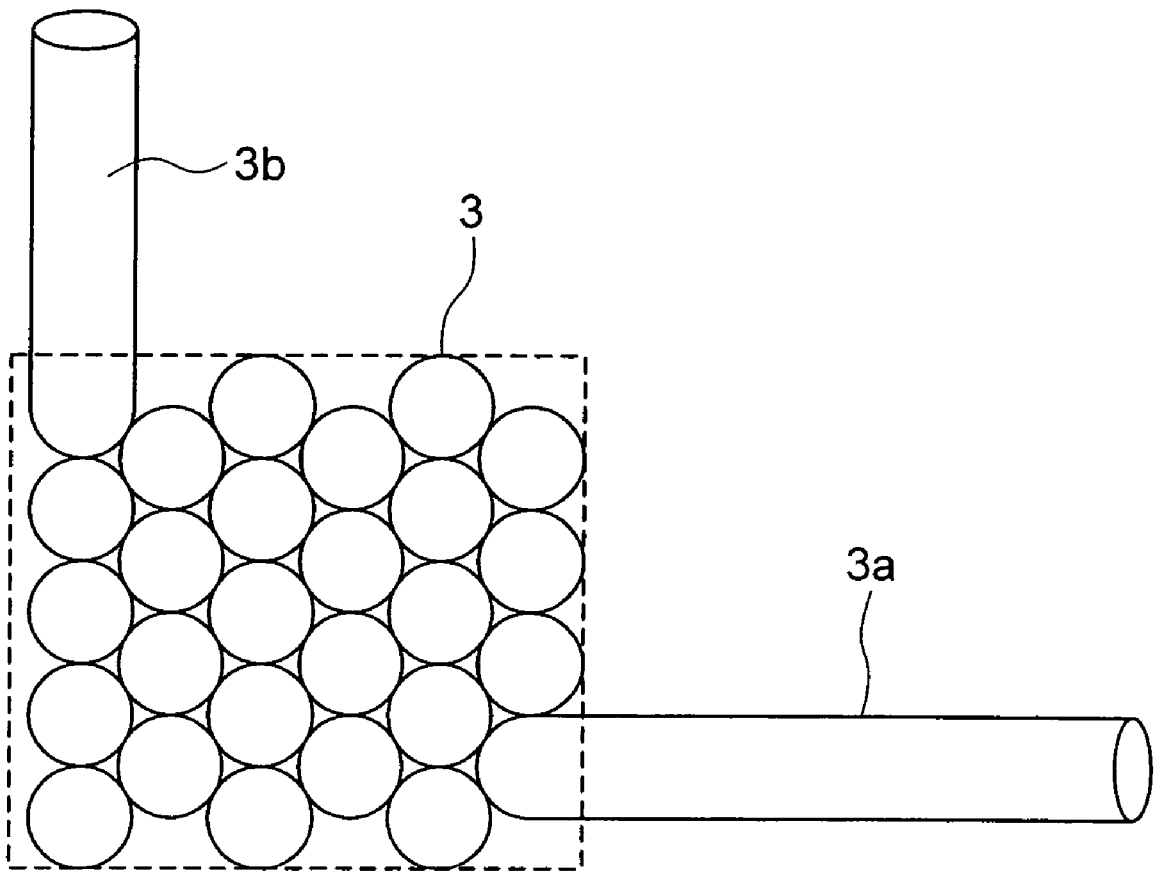
FIG. 2 is a cross sectional view of a leader line of a coil which is characteristic for the embodiment in accordance with the present invention.
Figure 3:
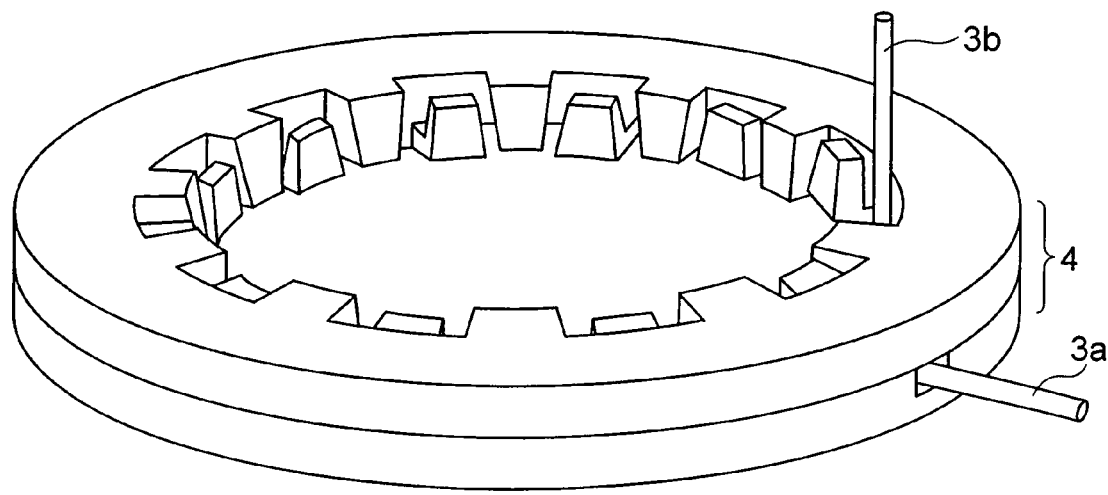
FIG. 3 is an outline view of a stator for one phase of a three-phase motor which is characteristic for an embodiment in accordance with the present invention.
Figure 11:
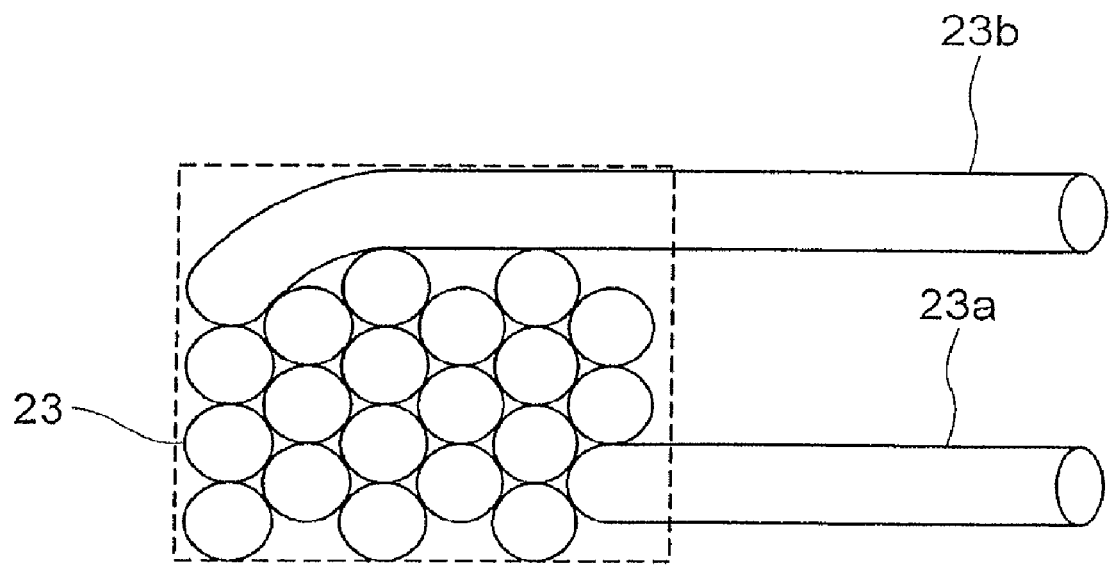
FIG. 11 is a cross sectional view of a leader line of a conventional coil.

With regard to the U-phase coil 3, as is known from a cross sectional shape of the U-phase coil 3 shown in FIG. 2, in comparison with FIG. 11, a winding number of the U-phase coil 3 can be increased. In this example, while a winding number of the coil in FIG. 12 is 21, a winding number of the U-phase coil 3 in FIG. 2 is 27, which is increased at 28% or more. An outline view of the U-phase stator 4 combined with FIG. 1 corresponds to FIG. 3. The structure is made such that the leader line 3b of the U-phase coil 3 is drawn from the positions 51a and 52a having no pawl-shaped magnetic pole in the stator cores 1 and 2. In the same manner, a V-phase stator 8 is constituted by stator cores 5 and 6, and a V-phase coil 7, and a W-phase stator 12 is constituted by stators 9 and 10, and a W-phase coil 11, respectively.

Figure 4:
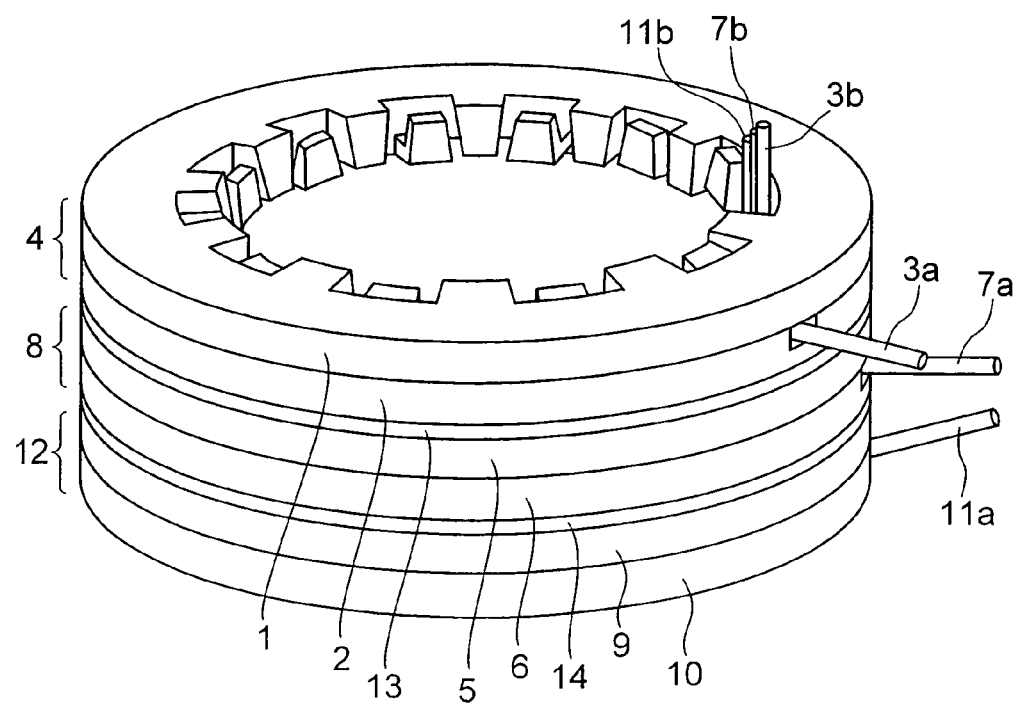
FIG. 4 is an outline view of a three-phase motor which is characteristic for the embodiment in accordance with the present invention.
Figure 5:
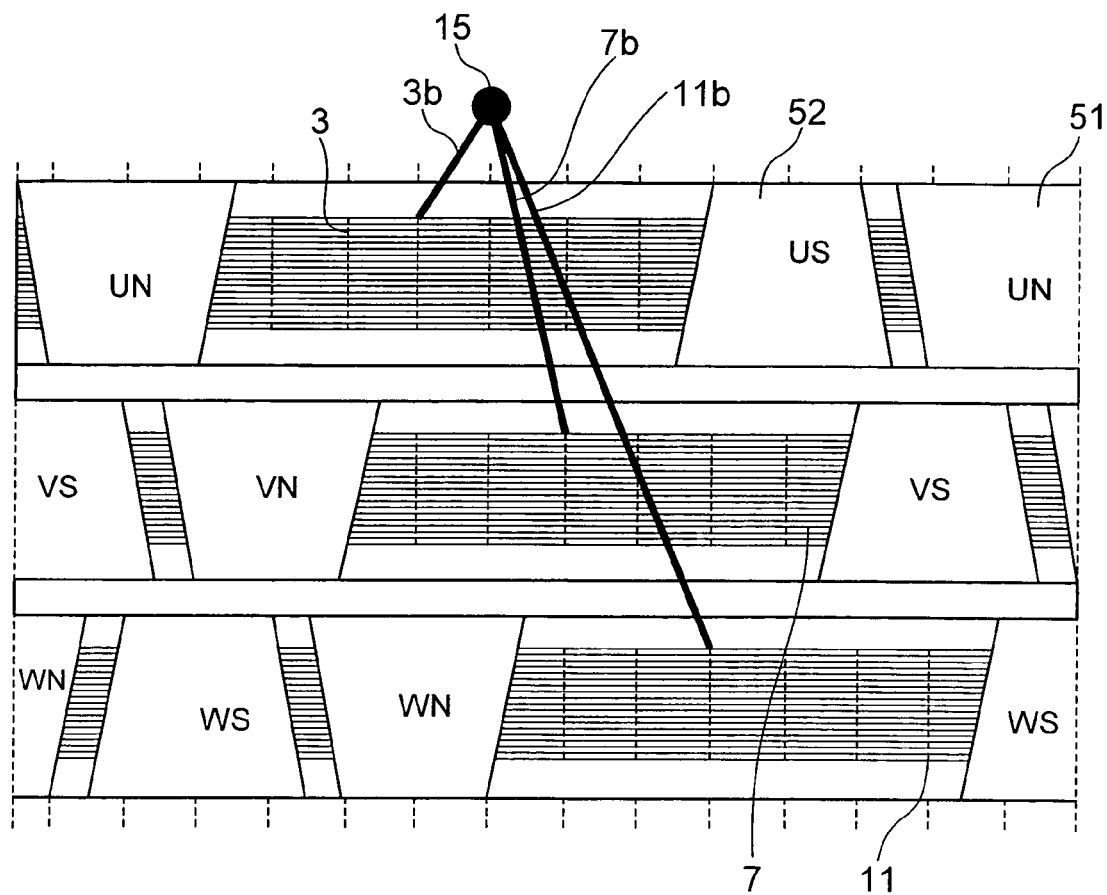
FIG. 5 is a side elevational expansion plan view in the case of viewing the stator of the three-phase motor which is characteristic for the embodiment in accordance with the present invention in a peripheral direction from a rotating shaft.
Figure 6:
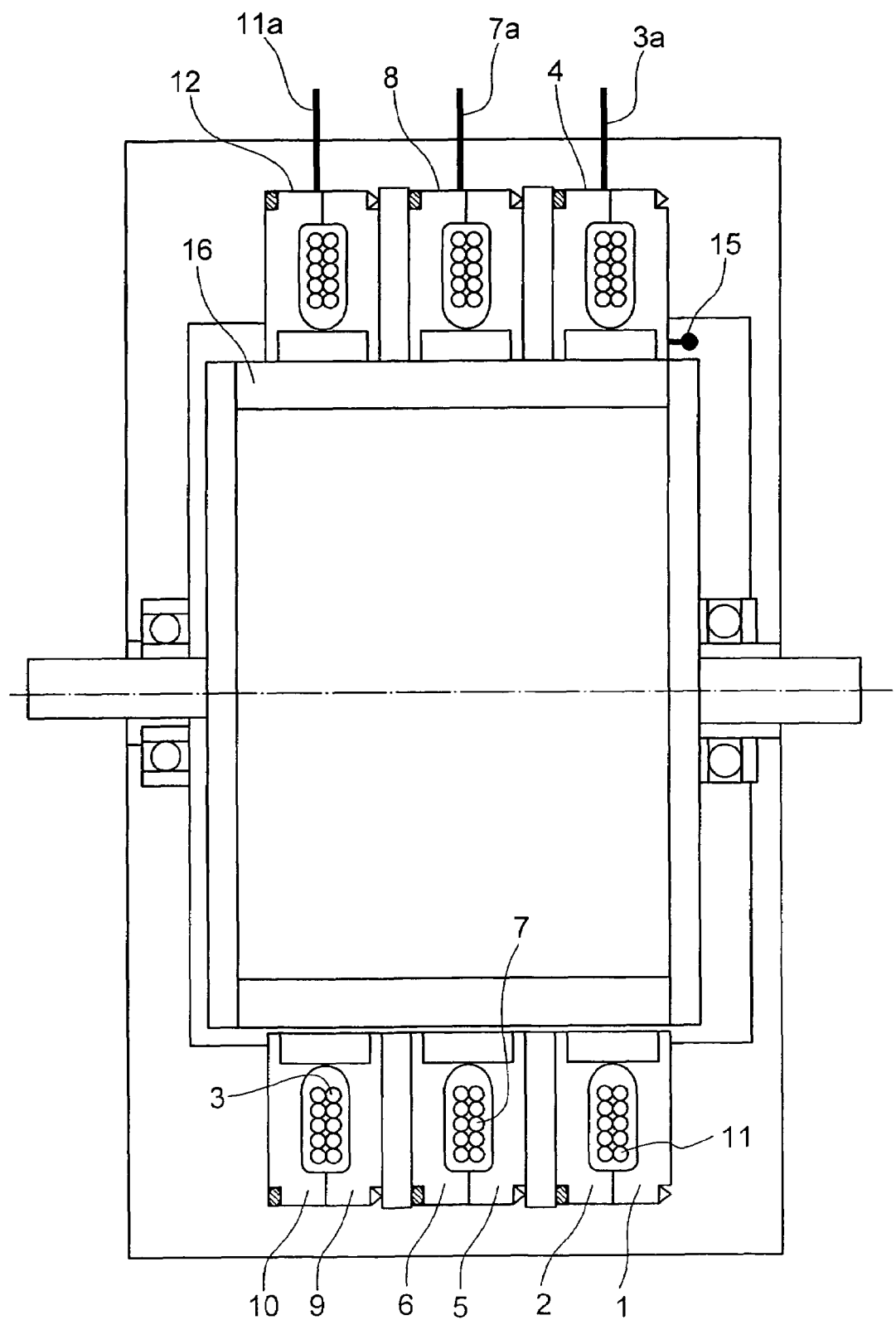
FIG. 6 is a cross sectional view of the three-phase motor which is characteristic for the embodiment in accordance with the present invention.

As shown in FIG. 4, a stator of a three-phase claw pole type motor is formed by overlapping these three stators 4, 8 and 12. The U-phase, V-phase and W-phase stators 4, 8 and 12 can drive the claw pole type motor on the basis of a three-phase ac voltage, by being shifted at 120 degree with each other. Further, in order to prevent from being affected by the magnetic field in each of the phases, magnetic field shielding materials 13 and 14 are inserted between the phases. Leader lines 3a, 7a and 11a of the respective phase coils are drawn out to an external portion from an outer diameter direction of the stators. On the contrary, leader wires 3b, 7b and 11b of the respective phase coils are drawn out in an axial direction from positions from which the pawl-shaped magnetic poles are removed, which is a feature of the present invention. A neutral point is formed by connecting them. FIG. 5 is an expansion plan view showing a relation between the leader lines and the pawl-shaped magnetic poles of the stators as seen from a rotor surface. The leader lines 3b, 7b and 11b are taken out in the axial direction from the positions from which the pawl-shaped magnetic poles are removed, and are connected by a connection portion 15. If a stator 16 is inserted to an inner portion of the stator mentioned above, the claw pole type motor as shown in FIG. 6 can be structured. In the claw pole type motor, a torque is reduced at a rate of the pawl-shaped magnetic pole which is reduced for forming a space passing the leader line of the coil therethrough. In other words, in the case of FIG. 4, since originally 24 pawl-shaped magnetic poles are reduced to 22 poles, the torque is reduced at about 8%. However, since the winding number of the coil is increased at 28% or more, as described above, it is possible to increase the torque at about 20%, in the claw pole type motor having the same shape. Further, in the case of designing at the same torque, it is possible to make the motor compact at about 20% by executing the present invention. Further, the number of the leader line for connecting to the external portion comes to three corresponding to the minimum of the three-phase claw pole type motor, it is not necessary to connect the neutral point in the external portion, and a handling characteristic is improved.

Figure 7:
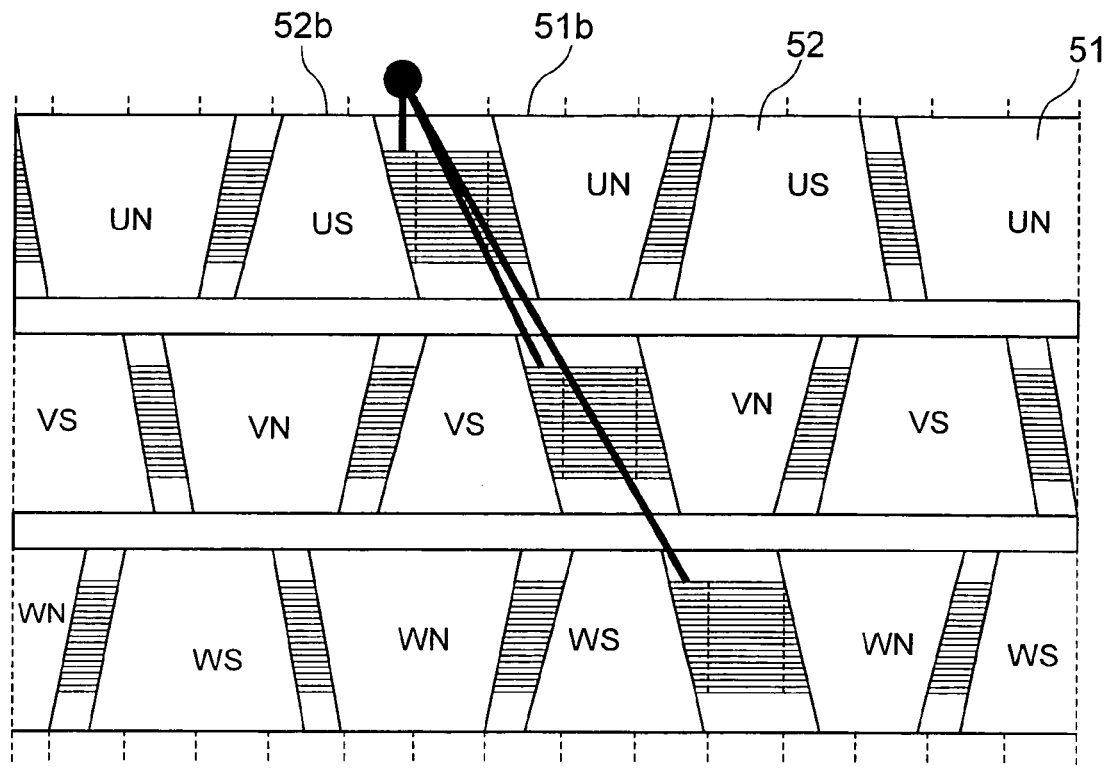
FIG. 7 is a side elevational expansion plan view of the other embodiment which is different from FIG. 5, of the three-phase motor which is characteristic for the embodiment in accordance with the present invention.

FIG. 7 shows the other embodiment in which only partial pawl-shaped magnetic poles 51b and 52b are formed in the different shape from the other pawl-shaped magnetic poles, in the pawl-shaped magnetic poles of the stator core. FIG. 7 is an expansion plan view of the stator as seen from the rotor surface, in the same manner as FIG. 5. The pawl-shaped magnetic poles 51b and 52b are made smaller in comparison with the other pawl-shaped magnetic poles, thereby forming the space for passing the leader line therethrough. Since an area at which the pawl-shaped magnetic pole faces to the rotor is increased in comparison with FIG. 5, by employing the structure mentioned above, it is possible to make the motor more compact.

Figure 8:
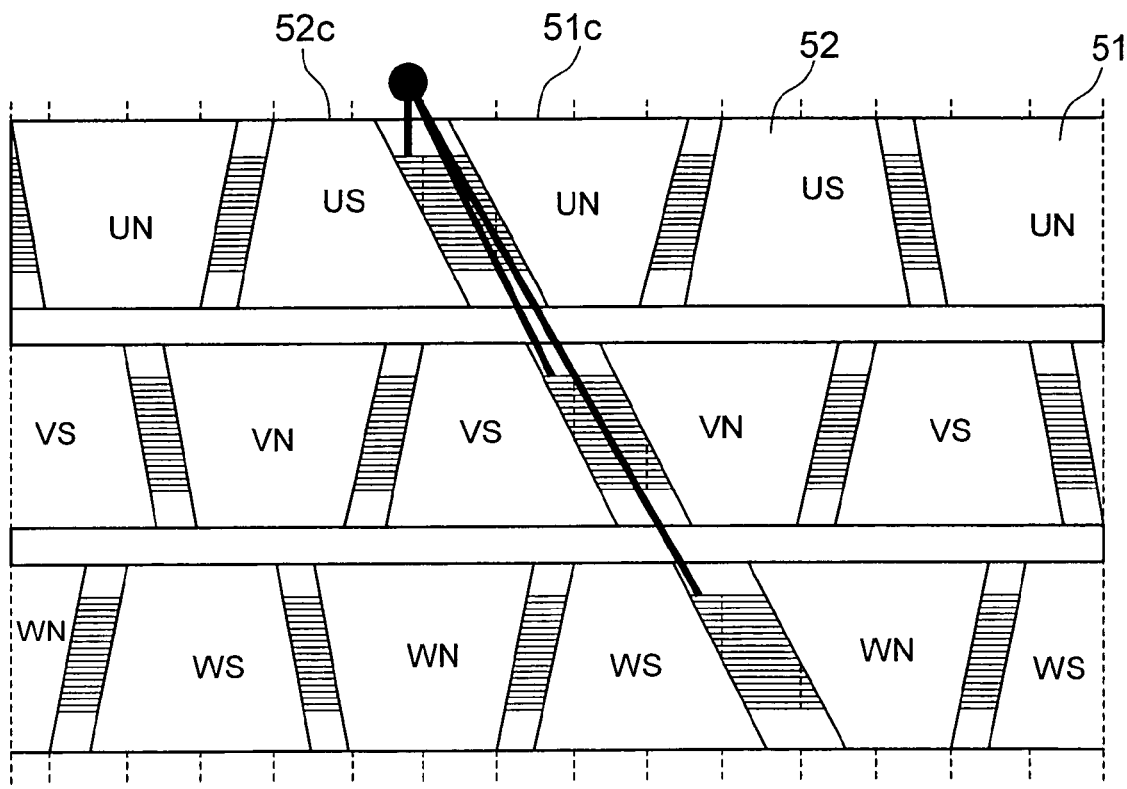
FIG. 8 is a side elevational expansion plan view of the other embodiment which is different from FIGS. 5 and 7, of the three-phase motor which is characteristic for the embodiment in accordance with the present invention.

In the case of an embodiment using pawl-shaped magnetic poles 51c and 52c shown in FIG. 8, since it is possible to increase an area of the further modified pawl-shaped magnetic poles 51c and 52c, it is possible to make the motor more compact.

In this case, as a method of forming the space for passing the leader line of the coil therethrough, there are proposed three methods. However, as a method of deforming a part of the pawl-shaped magnetic pole, there can be considered a method of executing in conformity with the shape of the leader line.

The embodiments obtained by applying the present invention to the three-phase claw pole type motor are described above, however, it goes without saying that the present invention can be applied to a two-phase claw pole type motor or a polyphase claw pole type motor. Further, the present invention can be applied to an outer rotor type motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A polyphase claw pole type motor comprising:
a rotor rotating around a rotating shaft;
a stator formed by mating a pair of annular stator cores provided with N number of pawl-shaped magnetic poles onto each other; and
an annular coil positioned between the pair of annular stator cores, the annular coil including a plurality of leader lines;
wherein a space for passing a leader line of the annular coil in an axial direction is provided along an inner peripheral side of the stator;
wherein a leader line of the annular coil is drawn out through at least one of (1) an outer peripheral portion of the stator and (2) a side of the stator opposite to a side of the stator facing the rotor; and
wherein another leader line of the annular coil is drawn out along the space provided along an inner peripheral side of the stator.

2. A polyphase claw pole type motor as claimed in claim 1, wherein a magnetic flux shielding member is provided between the stator and another stator.

3. A polyphase claw pole type motor as claimed in claim 1, wherein an annular stator core is formed by compression molding a pressed powder core.

4. A polyphase claw pole type motor comprising:
a rotor rotating around a rotating shaft; and
a stator formed by mating a pair of annular stator cores provided with N number of pawl-shaped magnetic poles to each other, and having an annular coil positioned between said pair of stator cores,
wherein a space passing a leader line of said annular coil therethrough is provided in an inner peripheral side of said stator core; and
wherein the space passing the leader line of said annular coil therethrough is formed by differentiating a shape of the Nth pawl-shaped magnetic pole from an optional position from a shape of the other pawl-shaped magnetic poles so as to enlarge a width of a gap between the pawl-shaped magnetic pole having the differentiated shape and the adjacent pawl-shaped magnetic pole.

5. A polyphase claw pole type motor comprising:
a rotor rotating around a rotating shaft; and
a stator formed by mating a pair of annular stator cores provided with N number of pawl-shaped magnetic poles to each other, and having an annular coil positioned between said air of stator cores;
wherein a space passing a leader line of said annular coil the therethrough is provided in an inner peripheral side of said stator core; and
wherein the space passing the leader line of said annular coil therethrough is formed by differentiating a shape of the Nth pawl-shaped magnetic pole from an optional position from a shape of the other pawl-shaped magnetic poles so as to change a width and an angle of a gap between the pawl-shaped magnetic pole having the differentiated shape and the adjacent pawl-shaped magnetic pole.

6. A polyphase claw pole type motor comprising:
a rotor rotating around a rotating shaft; and
a stator formed by mating a pair of annular stator cores provided with N number of pawl-shaped magnetic poles to each other, and having an annular coil positioned between said pair of stator cores;
wherein a space passing a leader line of said annular coil therethrough is provided in an inner peripheral side of said stator core; and
wherein the leader line of said annular coil is passed through a space formed by omitting an Nth pawl-shaped magnetic pole from an optional position.

7. A polyphase claw pole type motor comprising:
a rotor rotating around a rotating shaft; and
a stator formed by mating a pair of annular stator cores provided with N number of pawl-shaped magnetic poles to each other, and having an annular coil positioned between said pair of stator cores;
wherein a space passing a leader line of said annular coil therethrough is provided in an inner peripheral side of said stator core; and
wherein a neutral point is formed by connecting leader lines of said plurality of annular coils in an inner peripheral side of said stator core, and the leader lines of said plurality of annular coils are drawn out, in an outer peripheral side of said stator core.

8. A polyphase claw pole type motor comprising:
N number of pawl-shaped magnetic poles having a magnetic pole surface facing to a rotor with a gap and extending in a direction of a rotating shaft of said rotor;
an annular diametrical yoke portion extending in an outer diametrical direction from said pawl-shaped magnetic pole;

a stator core formed by said diametrical yoke portion and an outer peripheral side yoke extending in a direction of the rotating shaft of said rotor from said diametrical yoke portion;

a stator formed by mating a pair of said stator cores to each other, and alternately positioning said pawl-shaped magnetic poles in an inner peripheral direction in such a manner that a leading end of said pawl-shaped magnetic pole faces to the diametrical yoke portion of the adjacent pawl-shaped magnetic pole; and an annular coil provided in an inner portion of said stator, wherein a space passing a leader line of said annular coil is provided in a part of the pawl-shaped magnetic pole of said stator core.

9. A polyphase claw pole type motor as claimed in claim 8, wherein the space passing the leader line of said annular coil therethrough is formed by differentiating a shape of at least one pawl-shaped magnetic pole from a shape of the other pawl-shaped magnetic poles so as to enlarge a width of a gap between the pawl-shaped magnetic pole having the differentiated shape and the adjacent pawl-shaped magnetic pole.

10. A polyphase claw pole type motor as claimed in claim 8, wherein the space passing the leader line of said annular coil therethrough is formed by differentiating a shape of at least one pawl-shaped magnetic pole from a shape of the other pawl-shaped magnetic poles so as to change a width and an angle of a gap between the pawl-shaped magnetic pole having the differentiated shape and the adjacent pawl-shaped magnetic pole.

11. A polyphase claw pole type motor as claimed in claim 8, wherein the leader line of said annular coil is passed through a space formed by omitting at least one pawl-shaped magnetic pole.

12. A polyphase claw pole type motor as claimed in claim 8, wherein a member shielding a magnetic flux is provided between said stators in the multiple phases.

13. A polyphase claw pole type motor as claimed in claim 8, wherein said stator core is formed by compression molding a pressed powder core.

14. A polyphase claw pole type motor as claimed in claim 8, wherein a neutral point is formed by connecting leader lines of said plurality of annular coils in an inner peripheral side of said stator core, and the leader lines of said plurality of annular coils are drawn out, in an outer peripheral side of said stator core.

15. A polyphase claw pole type motor comprising:

a rotor rotating around a rotating shaft;

a stator formed by mating a pair of annular stator cores provided with N number of pawl-shaped magnetic poles onto each other, the annular stator cores aligned to create a space in an axial direction along an inner peripheral side of the annular stator core and between pawl-shaped magnetic poles; and an annular coil positioned between the pair of annular stator cores, the annular coil including a plurality of leader lines;

wherein a leader line of the annular coil is provided along an inner peripheral side of the stator, in an axial direction; and wherein another leader line of the annular coil is drawn out in a diameter direction, through a slot provided in an outer peripheral side of an annular stator core.

* * * * *

UNITED STATES PATENT AND TRADEMARK OFFICE
CERTIFICATE OF CORRECTION

| | | |
|---|---|---|
| PATENT NO. | : 7,692,344 B2 | Page 1 of 1 |
| APPLICATION NO. | : 11/634165 | |
| DATED | : April 6, 2010 | |
| INVENTOR(S) | : R. Masaki et al. | |

It is certified that error appears in the above-identified patent and that said Letters Patent is hereby corrected as shown below:

Title Page, after section (65) insert section --(30) Foreign Application Priority Data
May 31, 2006  (JP).................2006-150871--.

Signed and Sealed this
Seventh Day of June, 2011

David J. Kappos
*Director of the United States Patent and Trademark Office*